United States Patent
Ono et al.

(10) Patent No.: US 10,025,122 B2
(45) Date of Patent: Jul. 17, 2018

(54) OPTICAL DEVICE

(71) Applicant: Kohoku Kogyo Co., Ltd., Nagahama-shi (JP)

(72) Inventors: Hiroaki Ono, Tokyo (JP); Yuko Oota, Tokyo (JP)

(73) Assignee: Kohoku Kogyo Co., Ltd., Nagahama-shi, Shiga (JP)

( * ) Notice: Subject to any disclaimer, the term of this patent is extended or adjusted under 35 U.S.C. 154(b) by 0 days.

(21) Appl. No.: 14/911,198

(22) PCT Filed: Aug. 7, 2014

(86) PCT No.: PCT/JP2014/070847
§ 371 (c)(1),
(2) Date: Feb. 9, 2016

(87) PCT Pub. No.: WO2015/020140
PCT Pub. Date: Feb. 12, 2015

(65) Prior Publication Data
US 2016/0202506 A1    Jul. 14, 2016

(30) Foreign Application Priority Data

Aug. 9, 2013  (JP) .................................. 2013-165965

(51) Int. Cl.
*G02F 1/09*  (2006.01)
*G02F 1/01*  (2006.01)

(52) U.S. Cl.
CPC .............. *G02F 1/09* (2013.01); *G02F 1/0102* (2013.01); *G02F 1/0136* (2013.01); *G02F 1/092* (2013.01); *G02F 1/093* (2013.01)

(58) Field of Classification Search
CPC ......... G02F 1/0036; G02F 1/29; G02B 27/28; H01S 3/107; H01S 5/06236; H01S 3/005; B82Y 20/00; H04N 9/3197

(Continued)

(56) References Cited

U.S. PATENT DOCUMENTS 5,867,314 A * 2/1999 Ota .......................... G02B 7/00
                                                                335/298
6,028,702 A * 2/2000 Sasaki ..................... G02F 1/093
                                                                359/484.03

(Continued)

FOREIGN PATENT DOCUMENTS

CN        103003738 A      3/2013
EP        1 162 494 A1    12/2001

(Continued)

OTHER PUBLICATIONS

Int'l. Search Report issued in Int'l. App. No. PCT/JP2014/070847, dated Nov. 11, 2014.

(Continued)

*Primary Examiner* — Jie Lei
(74) *Attorney, Agent, or Firm* — Greer Burns & Crain Ltd.

(57) ABSTRACT

An optical device including a Faraday rotator, wherein the Faraday rotator includes a Faraday element 31 made of a magnetooptical material 34, two permanent magnets 35, and an electromagnet 20a, with a direction of travel of light as a front-rear direction, the Faraday element includes light incident/emission surfaces in front and rear, and surfaces parallel to each other in left and right, the plate-shaped permanent magnets are attached to each of left and right side surfaces of the Faraday element such that different magnetic poles are opposed to each other, and the permanent magnets are configured to apply a permanent magnetic field to the Faraday element in one direction of a left direction and a right direction, a shaft part 10 that holds the Faraday element, attached with the permanent magnets, over an entire length in the front-rear direction is included, the electromagnet is configured including a coil made by winding a conductor 21 around a periphery of the shaft part with the front-rear direction as an axis, and the electromagnet is (Continued)

configured to apply to the Faraday element a variable magnetic field in the front-rear direction.

7 Claims, 11 Drawing Sheets

(58) Field of Classification Search
USPC .. 359/484.02, 484.03, 484.1, 280, 245, 246, 359/315, 324, 281; 372/26, 27, 29.016
See application file for complete search history.

(56) References Cited

U.S. PATENT DOCUMENTS

| | | | | |
|---|---|---|---|---|
| 6,255,749 | B1* | 7/2001 | Aoshima | H02K 1/145 310/40 MM |
| 2003/0025980 | A1 | 2/2003 | Liu et al. | |
| 2003/0206347 | A1* | 11/2003 | Sabia | C03C 27/06 359/484.03 |
| 2009/0231701 | A1* | 9/2009 | Hua | H01S 3/0064 359/484.03 |
| 2009/0290213 | A1* | 11/2009 | Yamazaki | G02F 1/093 359/484.03 |
| 2013/0120824 | A1* | 5/2013 | Ono | G02B 27/28 359/284 |

FOREIGN PATENT DOCUMENTS

| | | | |
|---|---|---|---|
| JP | 06-051255 | | 2/1994 |
| JP | 1996-242523 | * | 7/1996 |
| JP | 09-236784 | | 9/1997 |
| JP | 2000-249997 | | 9/2000 |
| JP | 2002-148578 | | 5/2002 |
| JP | 2002-148578 | A | 5/2002 |
| JP | 2002-202484 | | 7/2002 |
| JP | 2005-24974 | | 1/2005 |
| JP | 2005-24974 | A | 1/2005 |
| JP | 2005-208295 | | 8/2005 |
| JP | 2005-208295 | A | 8/2005 |
| JP | 2005524864 | A | 8/2005 |
| JP | 2005-256569 | * | 9/2005 |
| JP | 2007-0071982 | | 3/2007 |
| JP | 2007-71982 | A | 3/2007 |
| JP | 2007071982 | A | 3/2007 |
| JP | 2012-27192 | | 2/2012 |
| JP | 2012-27192 | A | 2/2012 |
| JP | 2013-41095 | A | 2/2013 |
| JP | 2013041095 | A | 2/2013 |
| WO | 03093896 | A1 | 11/2003 |

OTHER PUBLICATIONS

Extended EP Search Report issued in EP App. No. 14 834 497.1, dated Feb. 22, 2017.
Japanese office action issued in corresponding Japanese App. No. 2013-165965, dated Mar. 31, 2017 (with translation).
Decision of refusal issued in corresponding Japanese patent application No. 2013-165965 dated Oct. 30, 2017 (with English translation).
Chinese Office Action issued in corresponding Chinese application No. 201480044749.4, dated Mar. 6, 2018 (with machine translation).

* cited by examiner

OPTICAL DEVICE

This is a National Phase Application filed under 35 U.S.C. § 371, of International Application No. PCT/JP2014/070847, filed Aug. 7, 2014.

TECHNICAL FIELD

The present invention relates to optical devices, and specifically relates to techniques to miniaturize optical devices using a Faraday rotator.

BACKGROUND

In an optical communication network with optical fibers as a transmission medium, various devices (hereafter, optical communication devices) such as a transceiver to convert electric signals into optical signals and to send the signals to the optical communication network, and a receiver that is for converting the received optical signal into an electric signal, are installed.

The exit and entrance of the optical signals of these optical communication devices are connected with, for example, optical devices such as an optical attenuator that modulates intensity of optical signals to a predetermined intensity and optical isolators to prevent occurrence of a "return light" which are optical signals that has been received that flow back to a light source side. Many of these optical devices are configured with the known Faraday rotator as a main body.

The Faraday rotator is configured including a Faraday element made of magnetooptical material such as magnetic garnet single crystal and a magnetic applying measure to apply a magnetic field to this Faraday element. The magnetic applying measure can variably control the direction and the size of the magnetic field, and normally this measure is configured from permanent magnets that apply a permanent magnetic field in a vertical direction with respect to the light incident/emission surfaces of the Faraday element to make the Faraday element be magnetically saturated, and an electromagnet to apply to the Faraday element a variable magnetic field that is orthogonal to a magnetic field direction of the permanent magnets. Configurations and operations of a conventional Faraday rotator are disclosed in Patent Literatures 1 and 2 indicated below. Further, Patent Literature 3 discloses such as a conventional optical attenuator that uses a Faraday rotator and a technique to improve the characteristics of the optical attenuator.

CITATION LIST

Patent Literature

PTL 1: Japanese Patent Application Laid-open Publication No. 9-236784
PTL 2: Japanese Patent Application Laid-open Publication No. 6-51255
PTL 3: Japanese Patent Application Laid-open Publication No. 2000-249997

SUMMARY

Technical Problem

An optical communication device and an optical device are required to be miniaturized to reduce installing space. With respect to such a request, miniaturization of the optical device and the optical communication device themselves, and integrating a plurality of devices can be considered. In other words, in the transmission path of optical communication, various optical devices are connected to a first part and a latter part of the optical communication device, thus in the case where the optical device is integrated with the optical communication device, the installing space of the optical device in the optical communication network can be reduced. The optical device, however, is generally connected with optical fiber collimators at both ends of a case storing the optical parts (a birefringent element, a Faraday element, and the like) and short optical fibers go out in the front-rear direction, and the device is namely a "pigtail type". The optical fibers of the optical device of this pigtail type are usually connected with optical fibers configuring the optical communication network by a method of such as fusion. Thus, when the optical device is to be incorporated into the optical communication device, a space to route the optical fibers connected to the optical device becomes necessary. When trying to secure the routing space within the optical communication device, the size of the optical communication device naturally becomes large.

This being the case, it is possible to make the optical device as a free space type. In other words, the transmission path of the optical signal in the optical communication device is made as a collimated light (beam) that propagates through space, not as optical fibers, and optical parts that configure the optical device can be installed on a route of the beam within the optical communication device. Since optical fibers are not necessary with this free space type optical device, the routing space for the optical fibers can be reduced. Further, loss that was occurring in the fusion parts of the optical fibers disappear in principle, and thus there is an advantage that propagation efficiency of optical signals increases.

In this way, with the free space type optical device, the installing space of the optical devices in the optical communication network is not necessary. The optical communication device that stores such optical devices is also required to be miniaturized, however, and it is especially difficult to install an optical device including a Faraday rotator within the optical communication device. Specifically, with respect to the size in the linear direction along the optical path, the size can be reduced for the amount required for routing the optical fibers, but the Faraday rotator is attached with permanent magnets that apply a biased magnetic field to make the Faraday element be magnetically saturated, and an electromagnet to make a variable magnetic field and to control a Faraday rotation angle. Thus, it is difficult to reduce the size in a direction that is orthogonal to an optical path that is an applying direction of the magnetic field. Of course, it is also necessary to maintain performance as an optical device, along with miniaturization of the device.

In this invention, a main objective is for an optical device including a Faraday rotator to be miniaturized without decreasing performance of the device.

Solution to Problem

This invention to achieve the objective is an optical device including a Faraday rotator, wherein
the Faraday rotator includes
a Faraday element made of a magnetooptical material,
two permanent magnets, and
an electromagnet, with a direction of travel of light as a front-rear direction, the Faraday element includes light incident/emission surfaces in front and rear, and surfaces parallel to each other in left and right, the two plate-shaped permanent magnets are attached to each of left and right side surfaces of the Faraday element such that different magnetic poles are opposed to each other, and the permanent magnets are configured to apply a permanent magnetic field to the Faraday element in one direction of a left direction and a right direction, a shaft part that holds the Faraday element, attached with the permanent magnets, over an entire length in the front-rear direction is included, the electromagnet is configured including a coil made by winding a conductor around a periphery of the shaft part with the front-rear direction as an axis, and the electromagnet is configured to apply to the Faraday element a variable magnetic field in the front-rear direction.

An optical device, wherein preferably the Faraday element is formed by laminating an even number of magnetooptical crystal films made of magnetooptical material in the front-rear direction, and the magnetooptical crystal films that are adjacent to each other are laminated to have crystal faces forming 180 degrees with respect to each other.

An optical device, wherein preferably a cylindrical magnet made of a hollow cylindrical permanent magnet is connected to a front end side of the coil to be coaxial, a compensation film is arranged inside the cylindrical magnet, the compensation film including light incident/emission surfaces to the front and the rear and being made of a magnetooptical material, a sum of a Faraday rotation angle of the compensation film that is obtained with the magnetic field in the front-rear direction that occurs within the hollow tube of the cylindrical magnet and a Faraday rotation angle of the Faraday element obtained with a leakage magnetic field to the rear side of the cylindrical magnet is 90 degrees, and a direction of a variable magnetic field of the electromagnet is in a direction that cancels the leakage magnet.

Further, an optical device, wherein a frame shaped spacer that is open to the front and the rear may be interposed between the compensation film and the Faraday element.

The optical device, wherein a front end and a rear end of the shaft part may protrude further to the front and the rear than a front end and a rear end of the coil, and a support base that supports the protruded sections of the shaft part from below and maintains an axis of the coil horizontally may be provided.

The shaft part may be a hollow cylindrical shape, or the shaft part may have a bottom surface to a lower side and side surfaces to the left and the right, and may have a U-shaped sectional shape along the front-rear direction with a lower side as a bottom part. Alternatively, the shaft part may be a box shape with a lower side as a bottom surface and an upper side that is open, and the shaft part may be formed with an opening in a front face and a rear face to expose the light incident/emission surfaces of the Faraday element. Further, the shaft part may be flat shaped and oppose each other from the left and the right, and the shaft part may sandwich from the left and the right the Faraday element that has been attached with the permanent magnets.

Advantageous Effects of Invention

With the optical device of this invention, miniaturization of the optical device is achieved while maintaining performance of the device. In this way, by making the optical device as a free space type and integrating it in various devices related to optical communication, installing space of the optical device can be reduced from the optical communication network.

DESCRIPTION OF EMBODIMENTS

Cross Reference of Related Applications

Figure 1A:
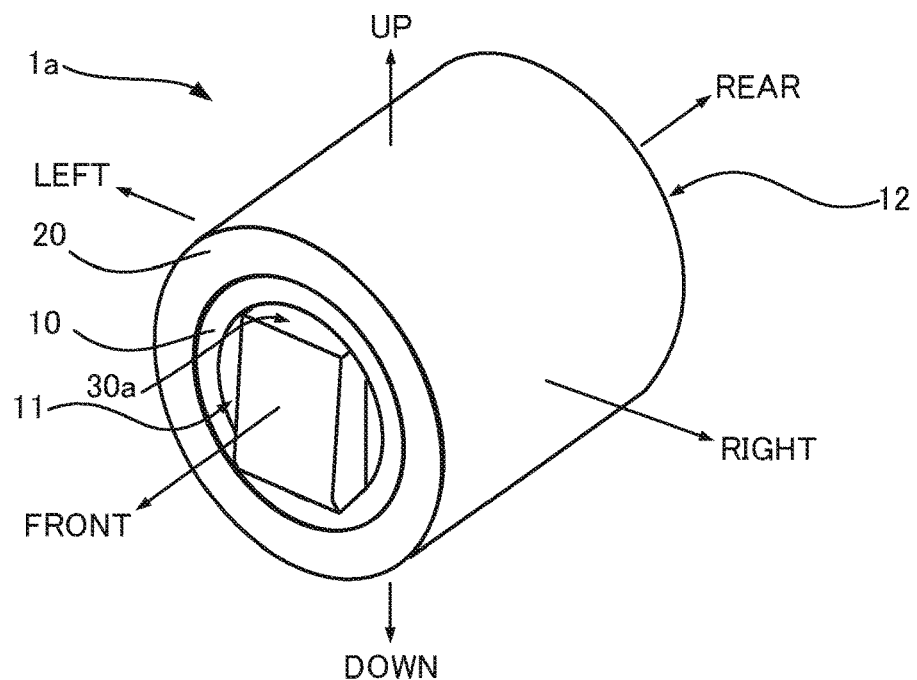
FIG. 1A is a diagram showing an optical device in accordance with a first embodiment of the present invention.

The present application claims priority upon Japanese Patent Application No. 2013-165965 filed on Aug. 9, 2013, which is herein incorporated by reference.

The embodiments of this invention will be described below with reference to attached drawings. In the drawings referred to in the below description, the same or similar parts have been given the same reference characters and repeated descriptions may be omitted.

First Embodiment

Figure 1B:
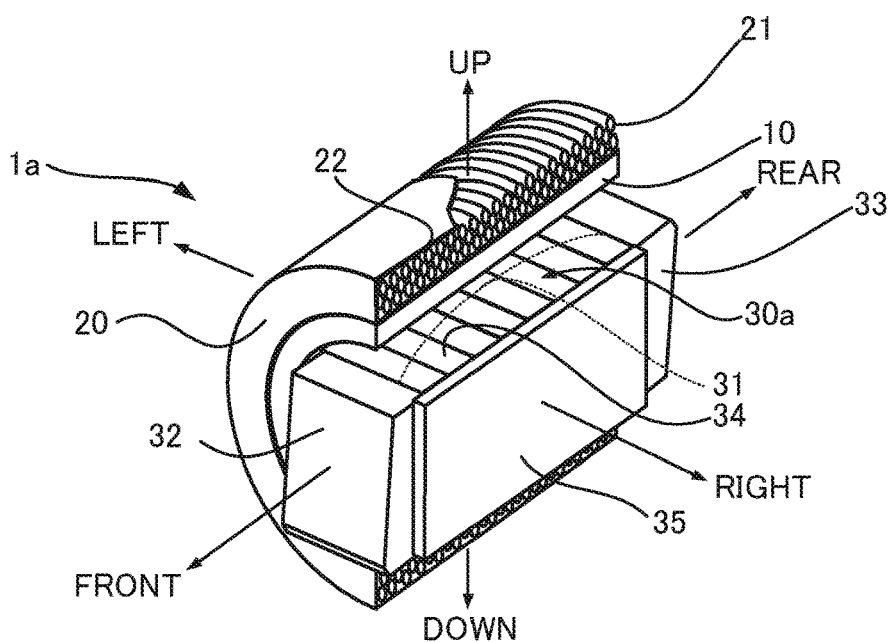
FIG. 1B is a diagram showing an optical device in accordance with the first embodiment of this invention.
Figure 1C:
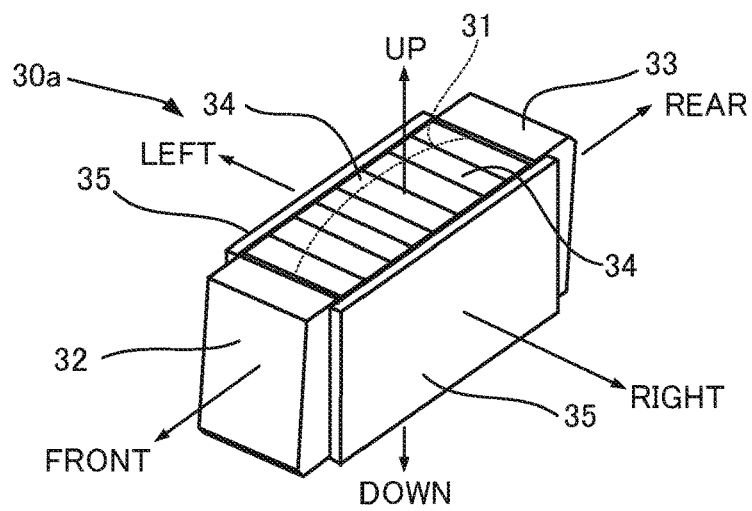
FIG. 1C is a diagram showing an optical device in accordance with the first embodiment of this invention.

FIG. 1A, FIG. 1B, and FIG. 1C show configurations of an optical device 1a in accordance with a first embodiment of the present invention. FIG. 1A is a perspective view showing an external appearance of the optical device 1a, and FIG. 1B is a partially cutaway perspective view showing an internal configuration of the optical device 1a. FIG. 1C is a perspective view showing an optical element 30a configuring the optical device 1a. As described below, to make the relative positional relationship of each of the sections of the optical device 1a clear, a front-rear direction is defined along a traveling direction of light that passes through the optical device 1a, and each direction to the front, rear, left, right, up, and down are defined as shown in the drawings. Thus, FIG. 1A, FIG. 1B, and FIG. 1C are perspective views of the optical device 1a when seen from the right upper front direction.

First, as shown in FIG. 1A, the optical device 1a is configured from a shaft part 10 made of resin in a hollow cylindrical shape having a cylindrical shaft along the front-rear direction, a hollow cylindrical coil part 20 arranged coaxially around the periphery of the shaft part 10, and an optical element 30a that is being held within the hollow cylinder of the shaft part 10. The optical element 30a is configured with a plurality of optical parts (31-33) having incident/emission surfaces of a beam to the front and the rear as a main body. The optical element 30a is configured such that the beam that is input from an opening of an end surface (11, 12) at either the front or the rear of the shaft part 10 is transmitted through each optical part (31-33) configuring the optical element 30a and is output from an opening of the other end surface (12, 11).

FIG. 1B is a sectional view (hereafter, also referred to also as a vertical sectional view) of the shaft part 10 and the coil part 20 seen from the left. As shown in FIG. 1B, the coil part 20 is substantially a coil formed by winding a conductor 21 around the shaft part 10 as a shaft, and the coil part 20 is made with the surface of the coil covered with an insulating tape 22. The optical element 30a stored inside the shaft part 10 is configured to include, as optical parts, the Faraday element 31 made of magnetooptical material configuring a Faraday rotator, birefringent elements (32, 33) made of rutile single crystals and the like, and also permanent magnets 35 to apply a permanent magnetic field to the Faraday element 31.

Each of the optical parts (31-33) of the optical element 30a is a square planar shape when seen in the front-rear direction with each side in the left-right up-down direction. The optical element 30a includes each of the optical parts (31-33) laminated in the front-rear direction. Specifically, as shown in FIG. 1C, the birefringent elements (32, 33) are arranged to the front end and the rear end, and the rectangular pillar Faraday element 31 is arranged between the birefringent elements (32, 33) in the front and the rear. The birefringent elements (32, 33) in the front and the rear are substantially the same, and one of the end surfaces to the front and the rear is a flat surface with the front-rear direction as a direction of the normal and the other end surface is an inclined surface, and the elements are namely "wedge-shaped birefringent elements". The two birefringent elements (32, 33) in the front and the rear have inner surfaces that oppose each other as flat surfaces and surfaces that face outside as inclined surfaces. The two birefringent elements (32, 33) in the front and the rear are made such that the directions of the inclined surfaces of both elements are opposite to each other, and the elements are in an arrangement rotated to form 180 degrees with the front-rear direction as the axis.

The Faraday element 31 is formed by laminating an even number of flat magnetooptical crystal films 34 in the front-rear direction and shaping the films into a rectangular pillar with the front-rear direction as the axis. Flat permanent magnets 35 are attached using an adhesive and the like to each of the left and the right side surfaces of the Faraday element 31 such that different magnetic poles are opposed to each other. The Faraday rotator is configured with the Faraday element 31, the permanent magnets 35, and the coil part 20. The Faraday element 31 is applied with a bias magnetic field in one direction of the left direction and the right direction with the permanent magnets 35, and a variable magnetic field is applied with the coil part 20 toward the front-rear direction.

It should be noted that the magnetooptical crystal films 34 adjacent to each other to the front and the rear in the Faraday element 31 are laminated such that their crystal orientation face opposite directions from each other. Thus, even in the case where a large permanent magnetic field cannot be made with the thin plate permanent magnets 35, each magnetooptical crystal film 34 can be made to be in a state close to magnetic saturation. Even in the case where each magnetooptical crystal film 34 is not completely magnetically saturated, the magnetooptical characteristic is canceled out with the magnetooptical crystal films 34 to the front and the rear, and the Faraday element 31 as a whole is in a substantially magnetically saturated state. Of course, in the case that there are plate-like permanent magnets that can make a large magnetic field or magnetooptical material with a very large Verdet constant, the magnetooptic crystal part may be configured from an integral rectangular pillar magnetooptical material. The optical device 1a in accordance with the first embodiment operates as an optical attenuator, and the arrangement of the optical parts (31-33), the basic operation, and an optical path of a beam that transmits the optical device 1a from the front to the rear is similar to conventional optical attenuators disclosed in such as PTL 1 to PTL 3. The optical device 1a in accordance with the first embodiment has a characteristic in the configuration in which the rectangular pillar Faraday element 31 made of magnetooptical crystal films 34 and planar permanent magnets 35 to apply a bias magnetic field are arranged inside the coil part 20 that makes a variable magnetic field. Due to this characteristic, the size of the optical device 1a in the up-down left-right direction which especially becomes a problem when installing the optical device within the optical communication device can be reduced to substantially the outside diameter of the coil part 20.

Figure 2:
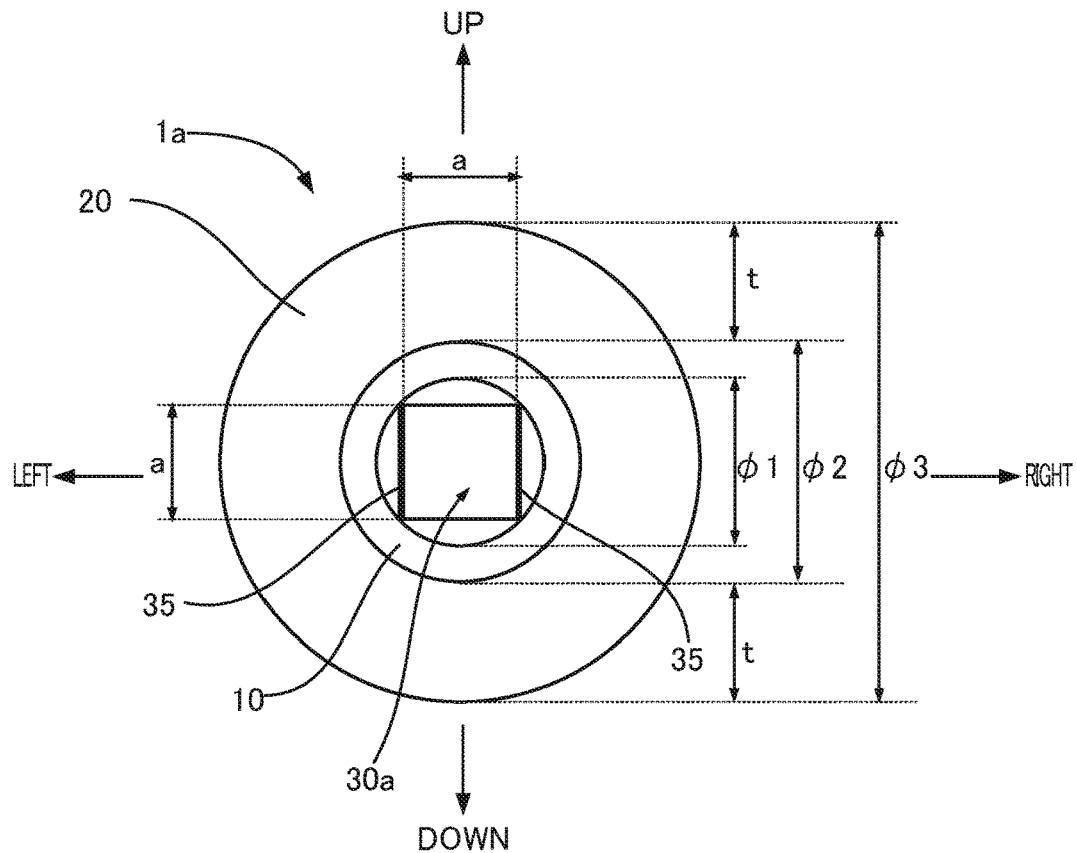
FIG. 2 is a diagram showing sizes of the optical device in accordance with the first embodiment.

FIG. 2 shows the size of each part of the optical device 1a of the first embodiment that has actually been made when seen from the front side. The optical parts (31-33) configuring the optical element 30a is a square planar shape when seen in the front-rear direction with a length of one side as a=1 mm. The permanent magnets attached to the left and the right of the Faraday element 31 is a thin plate shape (for example, a thickness of 10 μm), and an inner radius Ø1 of the shaft part 10 is a size that contacts a periphery of the optical element 30a. The outer diameter Ø2 of the shaft part 10 is 2.02 mm, and the conductor is wound around the periphery of the shaft part 10 to have a thickness of t=1 mm to form the coil part 20. Thus, the optical device 1a is generally an extremely thin cylindrical shape with an outer diameter Ø3 of approximately 4.02 mm, and the device has been made to be able to be installed as a free space type inside various optical communication devices which are progressing in miniaturization.

Second Embodiment

The optical device 1a of the first embodiment is an embodiment having the most basic structures. There is an embodiment of the optical device, however, in which the basic structure is added with some optical parts, depending on the mode and required performance when being incorporated in the optical communication device. As the optical device in accordance with a second embodiment, an optical device in which some optical parts have been added to the basic structure is described.

Figure 3A:
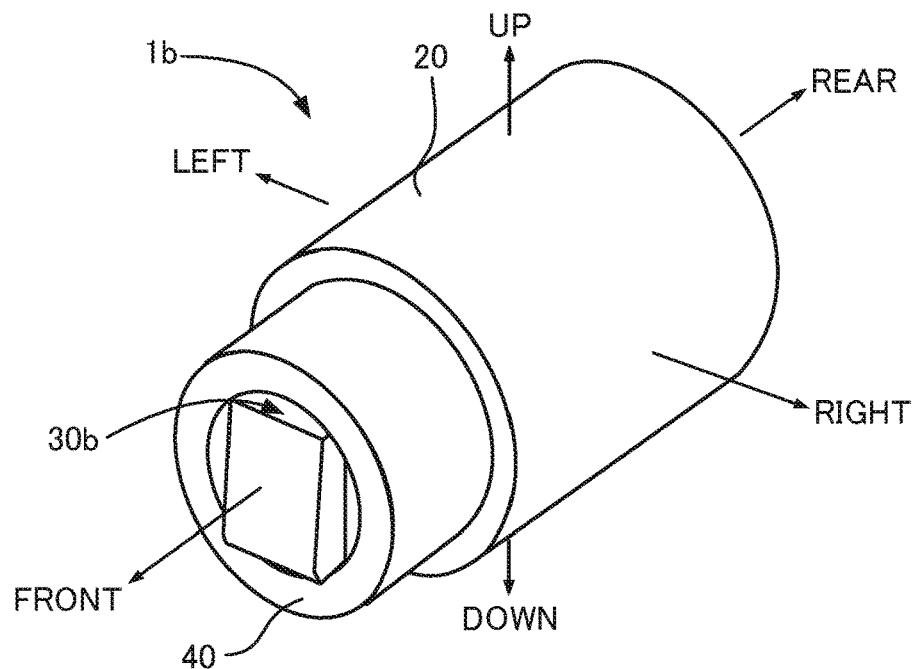
FIG. 3A is a diagram showing an optical device in accordance with a second embodiment of this invention.
Figure 3B:
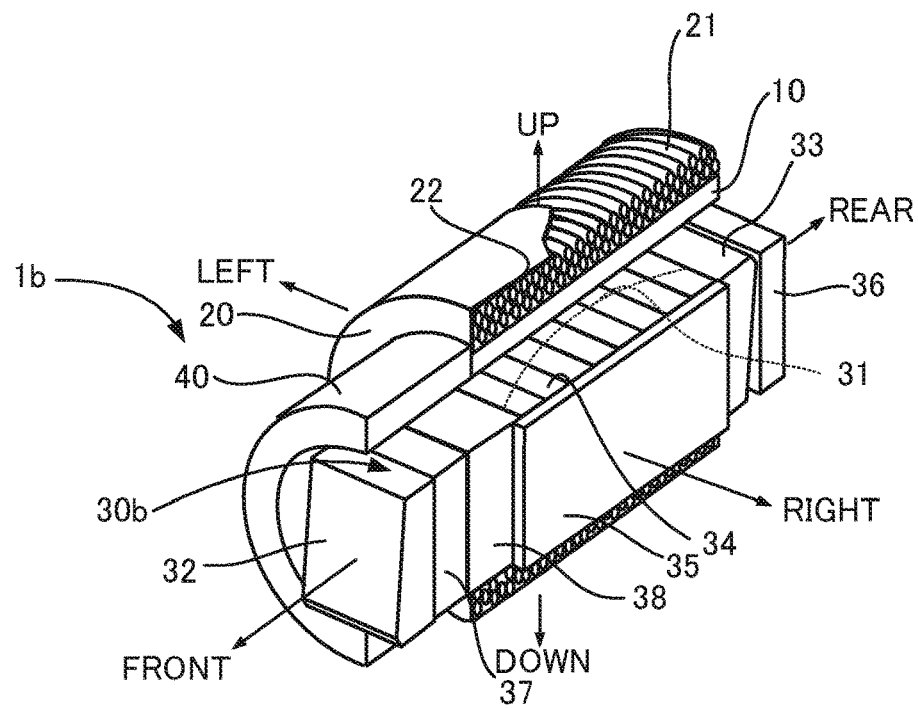
FIG. 3B is a diagram showing the optical device in accordance with the second embodiment of this invention.
Figure 3C:
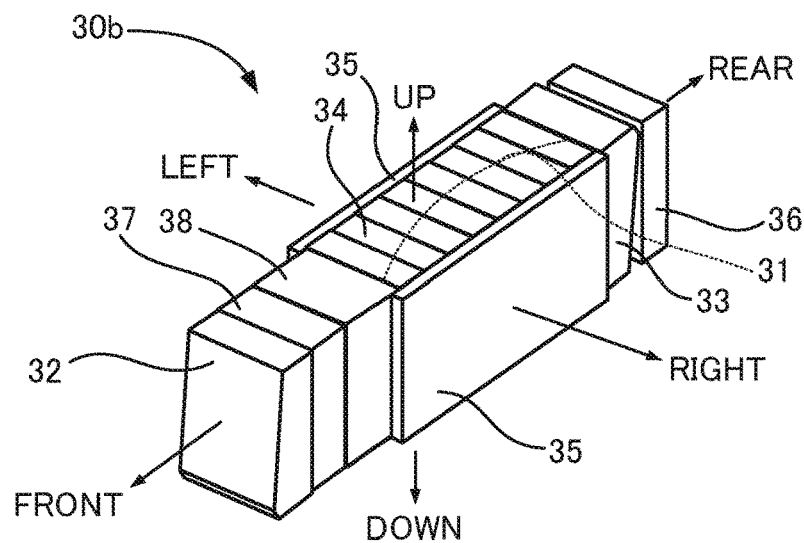
FIG. 3C is a diagram showing the optical device in accordance with the second embodiment of this invention.

FIG. 3A, FIG. 3B, and FIG. 3C are structural drawings of an optical device 1b in accordance with the second embodiment. FIG. 3A is a perspective view showing an external appearance of the optical device 1b, and FIG. 3B is a partially cutaway perspective view of the optical device 1b. FIG. 3C is a perspective view showing an optical element 30b configuring the optical device 1b. Also in this second embodiment, as similar to the first embodiment, each direction to the front, rear, up, down, left, and right of the optical device 1b are defined. The optical device 1b according to the second embodiment is an optical attenuator having a configuration (hereafter, also referred to as a compensation part) that compensates for dependence on wavelength or dependence on temperature of the Faraday rotation angle of the Faraday rotator (20, 31, 35). As shown in FIG. 3A, this optical device 1b has an external shape in which a hollow cylindrical ferrite permanent magnet (hereafter, also referred to as a cylindrical magnet) 40 is connected to the front of the coil part 20. As shown in FIG. 3B, the coil part 20 is made by winding a conductor 21 around a hollow cylindrical shaft part 10 and covering the coil surface with an insulating tape 22, as similar to the first embodiment. The cylindrical magnet 40 and the shaft part 10 are coaxially arranged, and both hollow parts have a same inner diameter, and both hollow parts form one continuous hollow cylinder, with the coil part 20 and the cylindrical magnet 40 in a connected state. The optical element 30b is stored in the hollow cylindrical section.

As shown in FIG. 3C, the optical element 30b has a configuration arranged with in order, from the front toward the rear, as optical parts, wedge shaped birefringent elements 32 that function as polarizers, a compensation film 37 made of a magnetooptical crystal film, a Faraday element 31, a wedge shaped birefringent element 33 that functions as an analyzer, and a thick plate birefringent element 36 that compensates a phase difference.

Here, when describing the optical device 30b and each of the optical parts (31-33, 36, 37) in more detail, and the Faraday element 31 is formed as a rectangular pillar with an even number of magnetooptical crystal films 34 laminated in the front-rear direction, as similar to the first embodiment, and plate-shaped permanent magnets 35 are attached to the left and right side surfaces of the Faraday element 31. In other words, the optical element 30b in the second embodiment is different from the optical element 30a in the first embodiment in that the compensation film 37 formed of magnetooptical crystal has been inserted between the birefringent element 32 at the front and the Faraday element 31.

The optical device 1b shown in the second embodiment is a polarization-independent type, and uses birefringent elements (32, 33) as a polarizer and an analyzer, thus a beam that enters the optical element 30b will pass through the optical element 30b as two linear polarizations that are orthogonal to each other and correspond to an ordinary ray and an extraordinary ray. As is well known, polarization mode dispersion (PMD) due to a phase difference between the ordinary ray and the extraordinary ray occurs. Thus, in the second embodiment, a thick plate birefringent element (hereafter, also referred to as a phaser) 36 that functions as a phase difference plate is added to further rear of the rear birefringent element 33. A rectangular frame shaped spacer 38 open to the front and the rear, which is not an optical part, is inserted between the compensation film 37 and the Faraday element 31.

In the above configured optical element 30b, the compensation film 37 is arranged within the cylindrical magnet 40, and the compensation part is configured with the cylindrical magnet 40 and the compensation film 37. The compensation film 37 rotates the linear polarization that has entered from the front by only an angle according to the permanent magnetic field along the front-rear direction made by the cylindrical magnet 40 and makes the linear polarization go out the rear. This rotation angle is set according to the wavelength-dependent and temperature-dependent properties of the Faraday rotation angle of the Faraday element 31. PTL 3 and the like discloses the compensation principle and the like with respect to wavelength-dependence property or temperature-dependence property with the compensation film 37 in the optical attenuator.

As described above, such as the type, the number, and the arrangement of the optical parts (31-33, 36, 37) configuring the optical element 30b of the optical device 1b in accordance with the second embodiment is equal to that of the conventional pigtail type. The optical device 1b of the second embodiment, however, has a characteristic in the configuration and the structure where the concept of the optical device 1a in accordance with the first embodiment has been expanded to the optical device including the compensation part and in such as the application method of a variable magnetic field appropriate for such configuration and structure. With such characteristics, dependence on wavelength and temperature of the Faraday rotator can be surely solved, and downsizing is achieved.

With the optical device 1b in accordance with the second embodiment, the external appearance of the Faraday rotator substantially matches the cylindrical coil part 20, and the external shape of the compensation part also matches the exterior of the cylindrical magnet 40 and is cylindrical. The optical device 1b overall has an external shape in which the cylindrical coil part 20 and the cylindrical magnet 40 are connected to the front and the rear. Thus, compared to the first embodiment, the size in the front-rear direction becomes large for adding the cylindrical magnet 40 and the phaser 36, but the arrangement of the optical parts (31-33, 36, 37) configuring the optical element 30b is the same as in the pigtail type, and the size of the optical element 30b in the front-rear direction has not become large. In other words, the pigtail type optical device including an optical fiber collimator in both ends to the front and the rear of the optical element and optical fibers that come out have been further miniaturized. Of course the size of the device in the up-down left-right direction becomes the outside diameter of the cylindrical coil part 20, similar to the first embodiment.

By the way, with the optical device 1b in accordance with the second embodiment, the compensation film 37 has to be arranged appropriately in the central position in the front-rear direction within the cylindrical magnet 40 and a permanent magnet field has to be applied equally to the front and the rear. Thus, naturally, the compensation film 37 and the Faraday element 31 are to be arranged apart from each other. In this example, an interval of 1-1.2 mm will be necessary. The compensation film 37 may be merely fixed to an inner surface of the cylindrical magnet 40, but in this example, a rectangular frame shaped spacer 38 is inserted between the compensation film 37 and the Faraday element 31, and the compensation 37 is to be arranged in the proper front-rear position. Further, even when adhesive flows out when adhering the compensation film 37 and the Faraday element 31 to each of the edge end faces to the front and the rear of the frame shaped spacer 38, the adhesive will stick to the inner surface of the frame of the spacer 38, and thus the optical path will not be blocked with the adhesive that has flowed out.

With the optical device 1b, the cylindrical magnet 40 and the coil part 20 that produces a variable magnetic field are arranged in a contacting state along the front-rear direction. The Faraday element 31 is applied with, as a magnetic field along the front-rear direction, a variable magnetic field made by the coil part 20 to control a Faraday rotation angle and a permanent magnetic field made by the permanent magnet 40 that is for providing a predetermined Faraday rotation angle to the compensation film 37. Thus, a part of a magnetic flux made by the permanent magnetic field produced by the cylindrical magnet 40 flows into the coil part 20 as a leakage flux. Then, in the second embodiment, the Faraday rotation angle of the compensation part is set, in consideration of the connecting structure of the cylindrical magnet 40 and the coil part 20.

Figure 4:
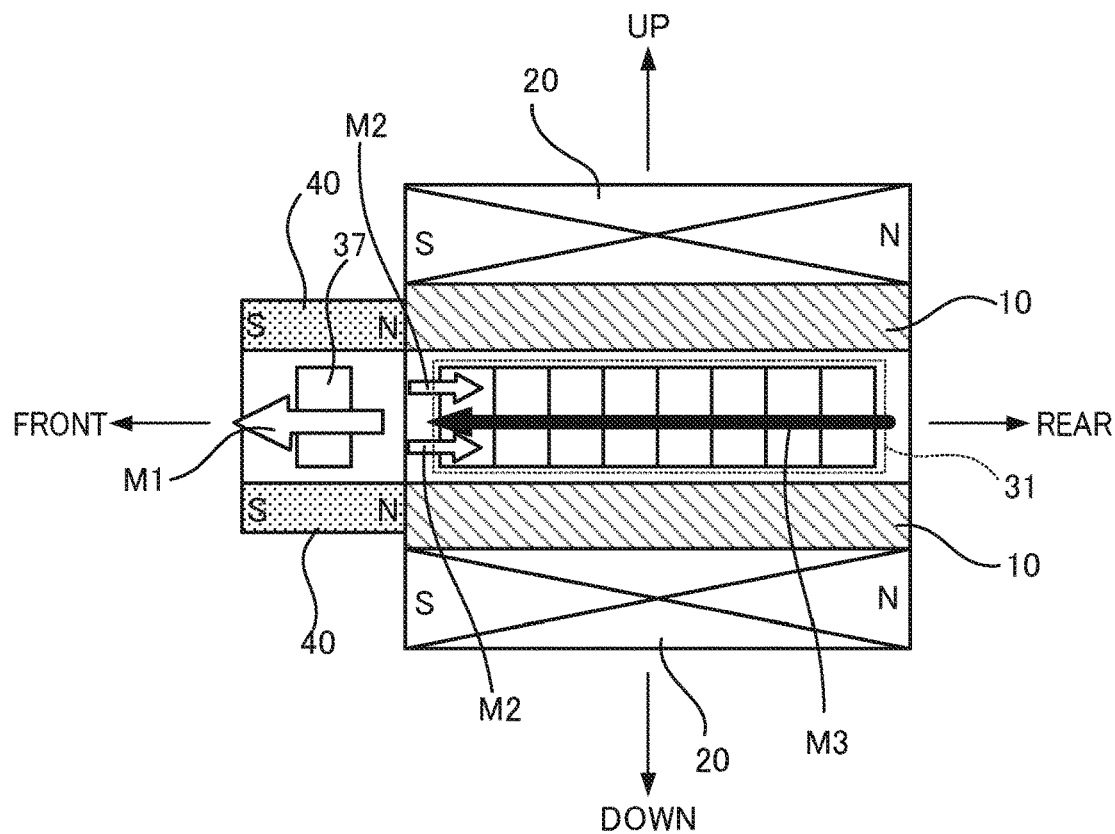
FIG. 4 is a diagram for explaining operations of the optical device in accordance with the second embodiment.
Figure 5A:
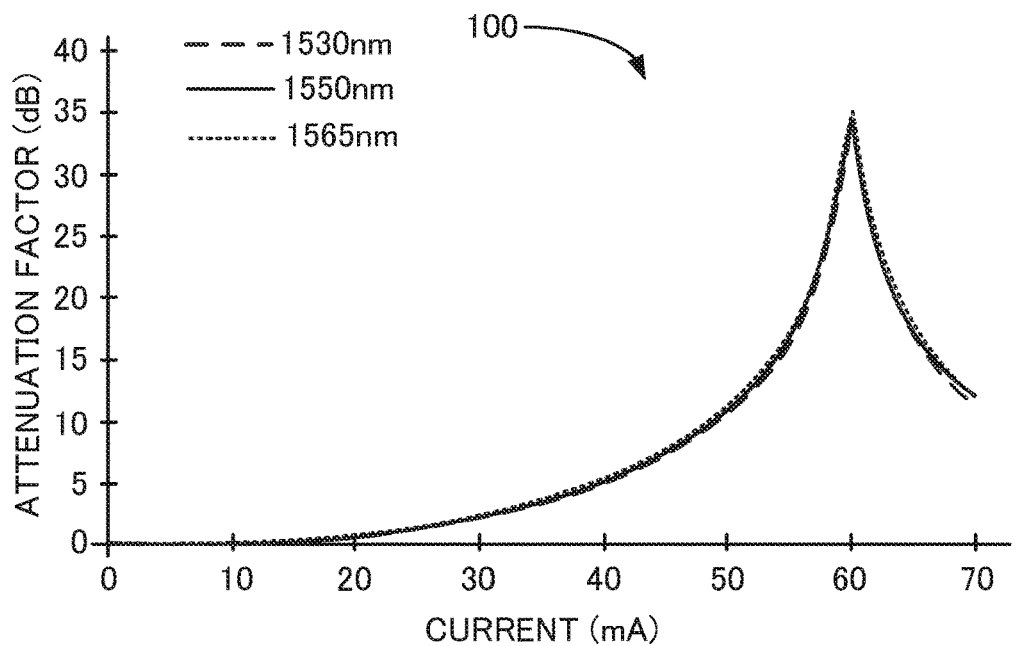
FIG. 5A is a diagram showing characteristics of the optical device in accordance with the second embodiment.
Figure 5B:
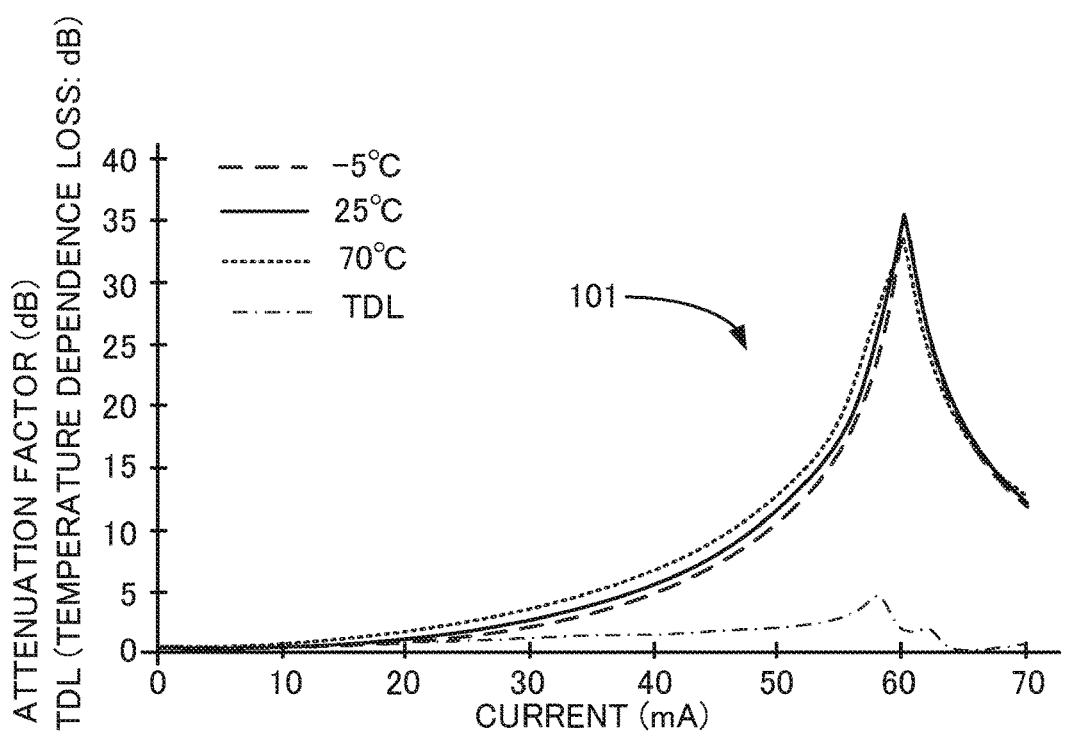
FIG. 5B is a diagram showing characteristics of the optical device in accordance with the second embodiment.

FIG. 4 shows a diagram for explaining a method of setting the Faraday rotation angle of the compensation film 37. FIG. 4 shows a sectional diagram of the state of the magnetic field produced by the cylindrical magnet 40 and the coil part 20 when seen from the right. Here, an example is shown where the front end of the cylindrical magnet 40 is an S-pole and the rear end of the cylindrical magnet 40 is an N-pole. As shown in FIG. 4, the magnetic fields (M1, M2) along the front-rear direction made by the cylindrical magnet 40 are a magnetic field M1 that passes through the compensation film 37 from the rear to the front within the cylindrical magnet 40, and a leakage magnetic field M2 that enters into the coil part 20 from the rear end of the cylindrical magnet 40 toward the rear. The Faraday element 31 also makes the Faraday rotation angle with the leakage magnetic field M2, thus the total of the Faraday rotation angle made by the leakage magnetic field M2 and the Faraday rotation angle made by the compensation film 37 are set to be 90 degrees. The coil part 20 is made to produce a variable magnetic field M3 in a direction that cancels out the leakage magnetic field from the cylindrical magnet 40. In this example, the variable magnetic field M3 is in a direction from the rear toward the front. Thus, the temperature coefficient and the wavelength coefficient of the Faraday element 31 are canceled out with the temperature coefficient and the wavelength coefficient of the compensation part. Then, when the variable magnetic field M3 is applied, the Faraday element 31 reduces the angle from the initial Faraday rotation angle of 90 degrees, and when the Faraday rotation angle becomes 0 degrees, the amount of attenuation becomes the maximum. FIG. 5A and FIG. 5B show the wavelength-dependence property and the temperature-dependence property of the optical device 1b in accordance with the second embodiment. FIG. 5A is a diagram showing the wavelength-dependence property, and the figure is a graph 100 showing a relationship between a current that flows in the conductor 21 of the coil part 20 and an attenuation factor with respect to light of each wavelength of 1530 nm, 1550 nm, 1565 nm at room temperature (25 degrees). As shown in this graph 100, substantially the same property has been obtained for all the wavelengths, and it has been confirmed that the wavelength-dependence of the Faraday element 31 has been solved with the compensation part. FIG. 5B shows a graph 101 of the temperature-dependence property. This graph 101 shows a relationship between a current flowing in the coil and an attenuation factor at each of the temperatures of −5 degrees, 25 degrees, and 70 degrees, and a difference between a maximum value and a minimum value of the attenuation factor in each current value (temperature dependence loss: TDL). As shown in this graph 101, substantially the same property has been obtained at all the temperatures, TDL is 5 dB or less at the maximum, and it has been confirmed that temperature dependence of the Faraday element 31 has been solved with the compensation part.

Third Embodiment

In the first and the second embodiments, the optical device is a structure with the Faraday element 31 arranged inside the cylindrical shaft part 10, and the external shape of the optical device (1a, 1b) is cylindrical with the front-rear direction as the axis. On the other hand, the optical elements (30a, 30b) are generally a rectangular pillar shape. Thus, there is a gap between the inner surface of the shaft part 10 and the outer surface of the optical elements (30a, 30b). Consequently, in the case where this gap may be reduced, the optical device may be miniaturized further. Since the external shape of the device is cylindrical, the optical device (1a, ab) cannot be "placed" on a flat surface. Thus, in the third embodiment, an optical device that has been miniaturized further and that may be easily installed is provided.

Figure 6A:
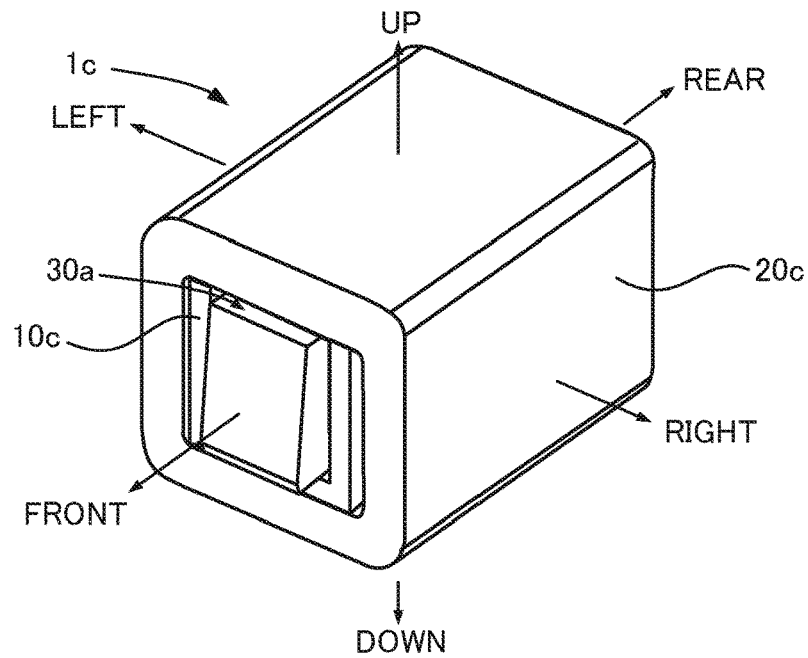
FIG. 6A is a diagram showing an optical device in accordance with a third embodiment of this invention.
Figure 6B:
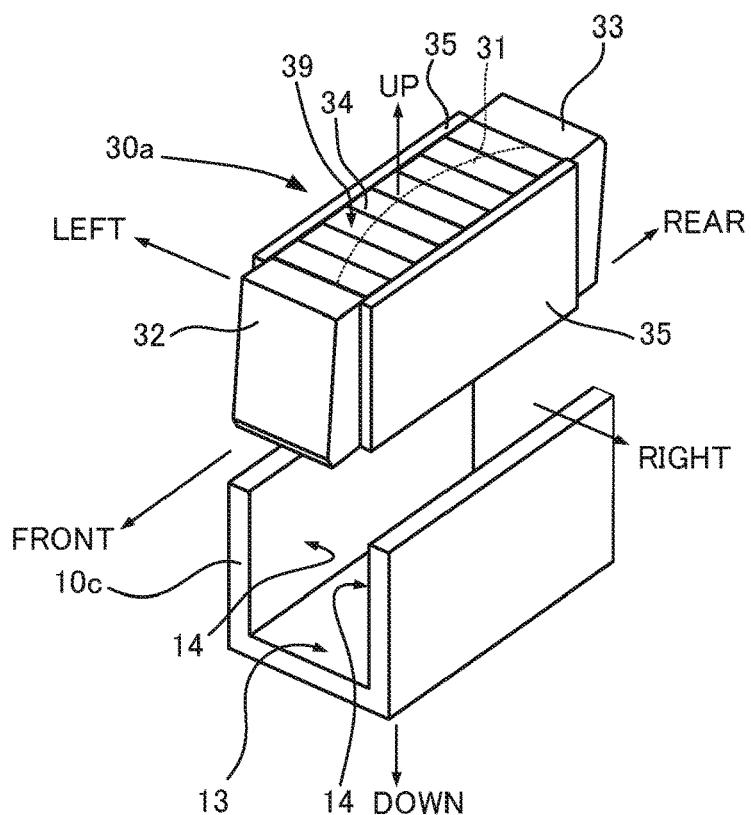
FIG. 6B is a diagram showing the optical device in accordance with the third embodiment of this invention.
Figure 6C:
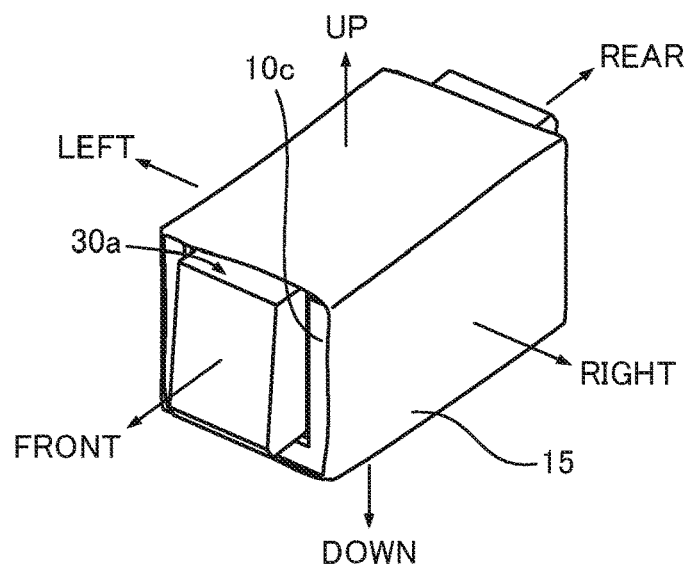
FIG. 6C is a diagram showing the optical device in accordance with the third embodiment of this invention.

FIGS. 6A, 6B, and 6C are diagrams showing the configuration of an optical device 1c in accordance with the third embodiment. FIG. 6A is a perspective view showing an exterior of the optical device 1c. FIG. 6B is a perspective view showing the optical element 30a and the shaft part 10c. FIG. 6C is a perspective view showing the optical device 1c with the coil part 20 removed. With the optical device 1c shown in FIG. 6A, FIG. 6B, and FIG. 6C, each of the directions to the front, rear, up, down, left, and right have been defined, as similar to the first and the second embodiment. As shown in FIG. 6A, the optical device 1c of the third embodiment has a hollow rectangular pillar coil part 20c. As shown in detail in FIG. 6B, when seen from the front, the shaft part 10c has a U shape with the lower part as a bottom part and the upper part that is open. The Faraday element 31 with permanent magnets 35 attached to the left and right side surfaces are arranged inside the shaft part 10c so as to come in contact with a bottom surface 13 and left and right side surfaces 14 of the shaft part 10c. Thus, when this optical device 1c is seen from the front, the outer surface of the optical element 30c and the inner surface of the shaft part 10c are in contact without a gap in between. A conductor is wound around the shaft part 10c to form the hollow rectangular tube coil part 20c, and the Faraday rotator made of the Faraday element 31, the permanent magnets 35, and the coil part 20 is formed into an integral rectangular pillar shape. In this example, as shown in FIG. 6C, a region from an upper surface 39 of the Faraday element 31 over the outer periphery of the shaft part 10c is covered with an insulating tape 15, so that the upper surface 39 of the Faraday element 31 and the conductor of the coil part 20 do not directly come into contact. In this way, with the optical device 1c in accordance with the third embodiment, the Faraday element 31 is arranged inside the U shaped shaft part 10c and in contact with the Faraday element without a gap, and the optical device can be further miniaturized than the optical device 1a in accordance with the first embodiment. The coil part 20c is a rectangular pillar, has high stability when placed directly on a flat surface, and is easy to install within an optical communication device.

Modified Example

Figure 7A:
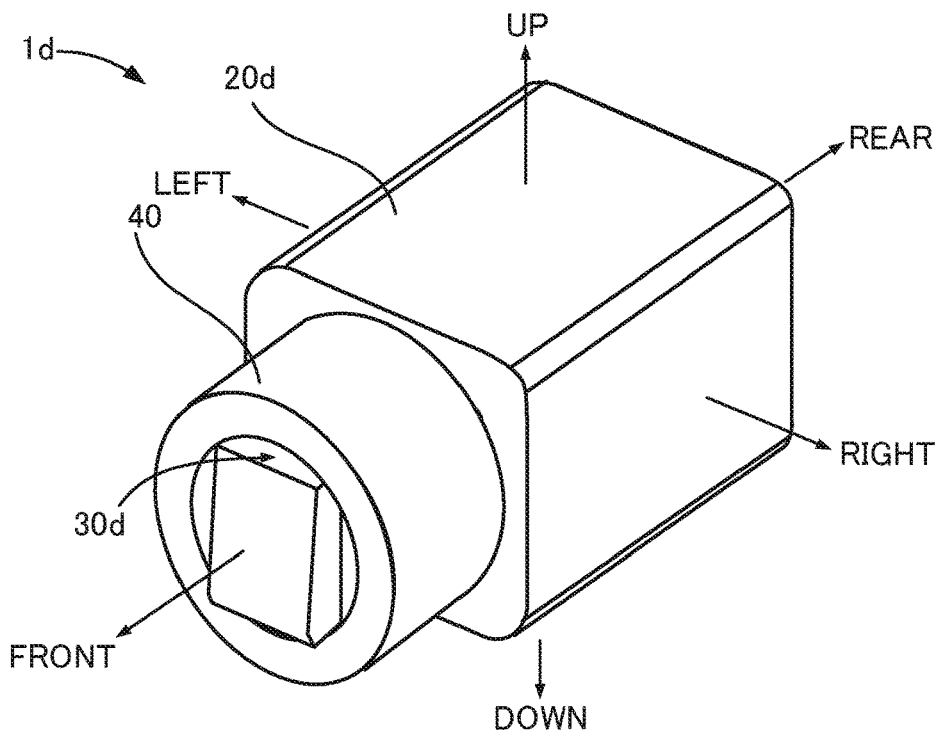
FIG. 7A is a diagram showing a modified example of an optical device in accordance with a third embodiment of this invention.
Figure 7B:
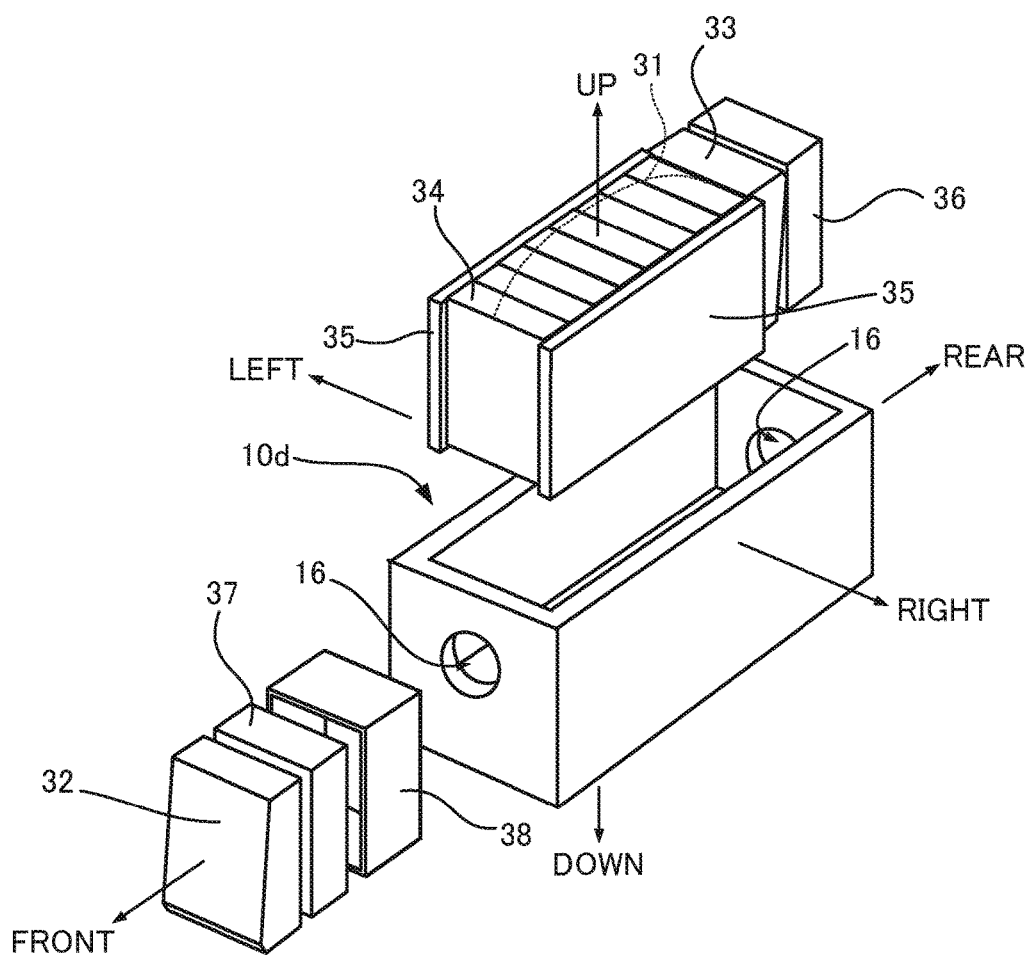
FIG. 7B is a diagram showing the modified example of the optical device in accordance with the third embodiment.
Figure 8A:
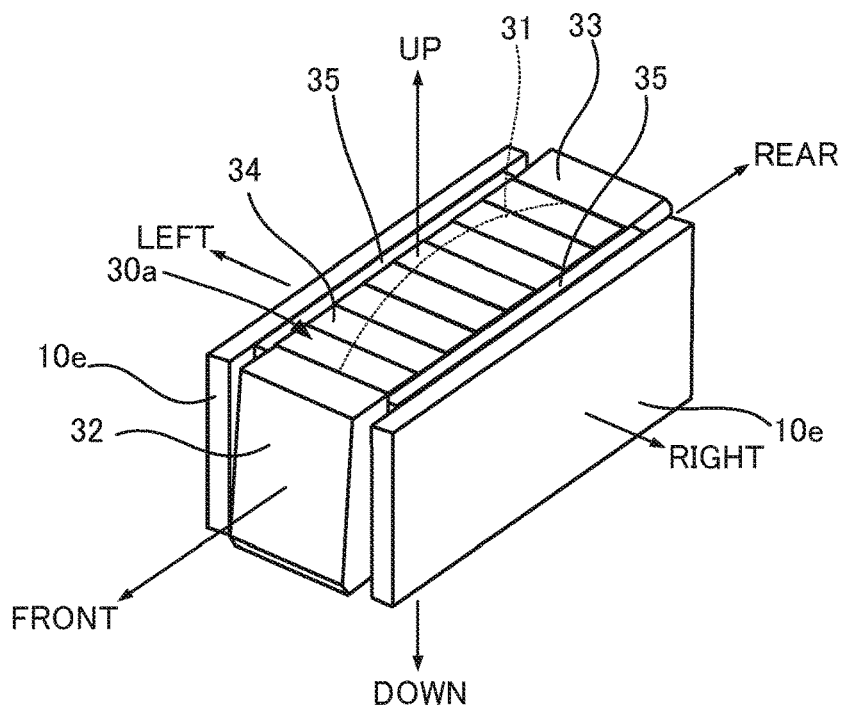
FIG. 8A is a diagram showing another modified example of an optical device in accordance with the third embodiment.
Figure 8B:
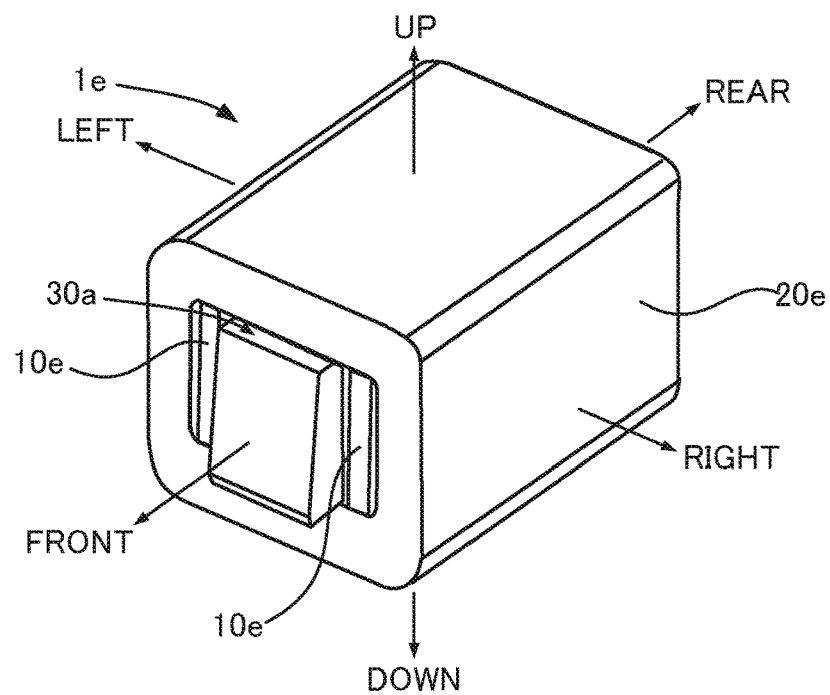
FIG. 8B is a diagram showing another modified example of the optical device in accordance with the third embodiment.

In the third embodiment, several modified examples with differently shaped shaft parts are considered. FIG. 7A and FIG. 7B show a modified example of an optical device 1d including a compensation film 37 as in the optical device 1b in accordance with the second embodiment. FIG. 7A is a perspective view showing the exterior of the optical device, and FIG. 7B is a perspective view showing a shaft part 10d and an optical element 30d of the optical device 1d. As shown in FIG. 7A, with the optical device 1d, a cylindrical magnet is connected to the front of the rectangular pillar coil part, and as shown in FIG. 7B, the device is a box shape formed with holes 16 to let an optical path through in the front and the rear and with the shaft part 10d open to the upper part. The optical parts from the phaser 36 in the rear end of the optical element 30d to the Faraday element 31 are arranged in the box shaped shaft part 10d, and the optical parts (32, 37) and the spacer 38 to the front side than the Faraday element 31 are arranged to the front of the box shaped shaft part 10d. FIG. 8A and FIG. 8B show other modified examples of the third embodiment. FIG. 8A is a diagram showing the shaft parts 10e and the optical element 30a arranged inside the shaft parts 10e. FIG. 8B is a diagram showing the exterior of an optical device 1e in accordance with the other modified example. As shown in FIG. 8A, the shaft parts 10e are two plate-shaped parts that face each other, and the plate-shaped shaft parts 10e sandwich the Faraday element 31 from the left and the right. The structure of the optical element 30a is the same as in the first embodiment. As shown in FIG. 8B, the optical device 1e including the shaft parts 10e does not have a bottom surface in the shaft parts 10e, and thus the size in the up-down direction may be made even more smaller.

Figure 9A:
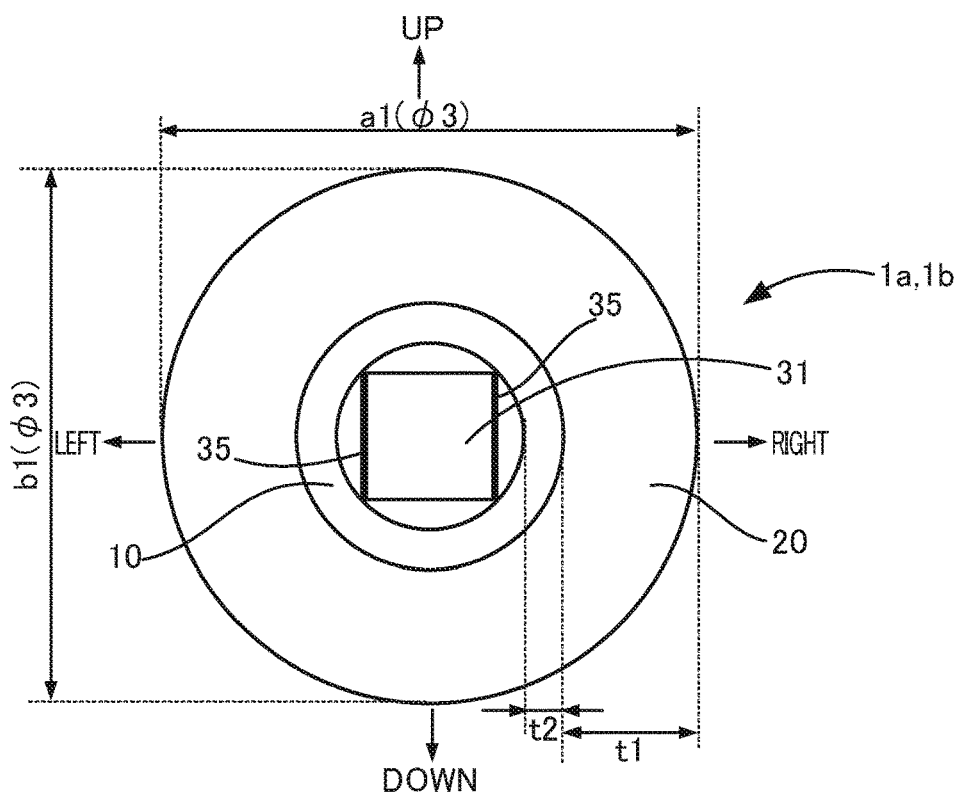
FIG. 9A is a diagram for comparing sizes of the optical devices in accordance with the first embodiment to the third embodiment, and the modified examples of the third embodiment.
Figure 9B:
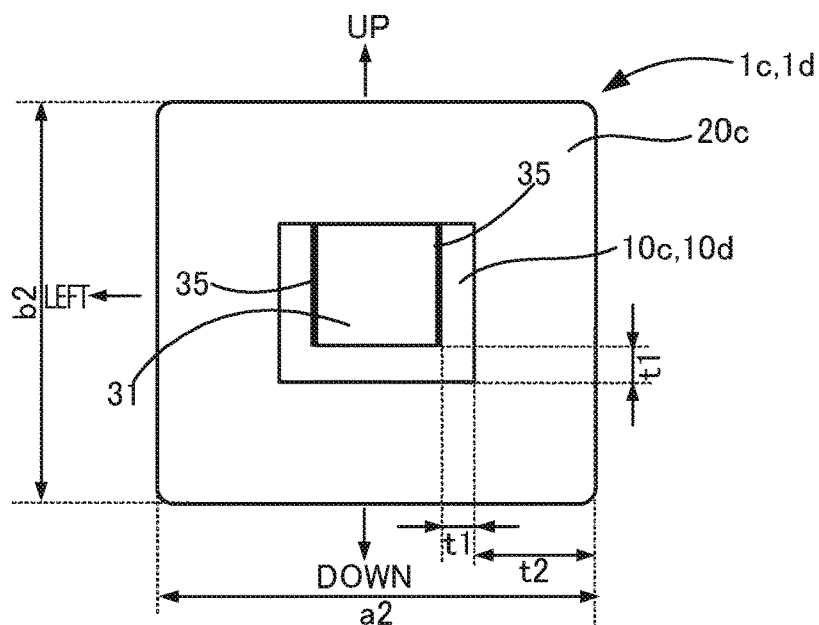
FIG. 9B is a diagram for comparing sizes of the optical devices in accordance with the first embodiment to the third embodiment, and the modified examples of the third embodiment.
Figure 9C:
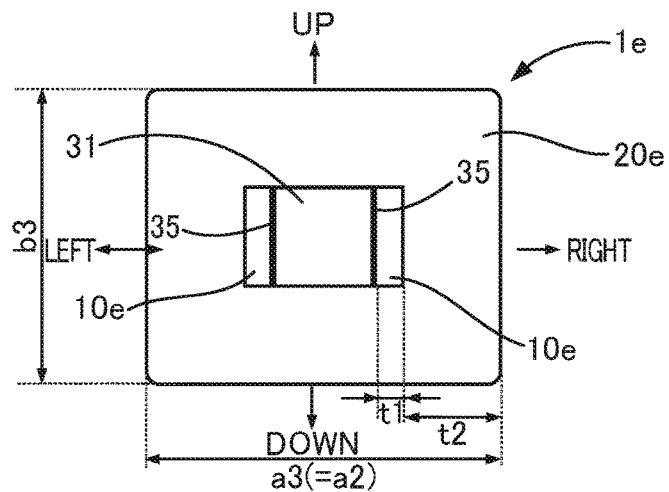
FIG. 9C is a diagram for comparing sizes of the optical devices in accordance with the first embodiment to the third embodiment, and the modified examples of the third embodiment.

In order to compare the size of the optical devices (1a to 1e) in each of the above embodiments, FIG. 9A, FIG. 9B, and FIG. 9C show the section of the coil parts when the optical devices (1a to 1e) are seen from the front. FIG. 9A shows the size of the optical devices (1a, 1b) in accordance with the first or the second embodiment. FIG. 9B shows the sizes of the optical device 1c in accordance with the second embodiment shown in FIG. 6A, FIG. 6B, and FIG. 6C or the optical device 1d shown in FIG. 7A and FIG. 7B. Further, FIG. 9C shows the size of the optical device 1e shown in FIG. 8A and FIG. 8B. As shown in FIG. 9A, FIG. 9B, and FIG. 9C, in regards to all the optical devices (1a to 1e), in the case where the thickness t1 of the shaft part and the thickness t2 of the coil part are the same, as shown in the figures, the size in the up-down and left-right direction can be made smaller with the optical device (10c, 10d) including the U-shaped section shaft parts (10c, 10d) and the optical device 1e including the two plate shaped shaft parts 10e that face each other, than the optical devices (1a, 1b) including the hollow cylindrical shaped shaft part 10. Further, the optical device 1e including the two plate shaped shaft parts 10e that face each other can be made to have a further smaller size in the up-down direction than the optical devices (1c, 1d) including the U-shaped shaft part (10c, 10d) (a1>a2=a3, b1>b2>b3).

Table 1 shows sizes of each section of the optical devices (1a to 1e) of each embodiment that have been actually made.

TABLE 1

| Optical device | Left-right width (mm) | Up-down height (mm) |
| --- | --- | --- |
| 1a, 1b | a1 = 4.02 | b1 = 4.02 |
| 1c, 1d | a2 = 3.60 | b2 = 3.30 |
| 1e | A3 = 3.60 | b3 = 3.02 |

The optical devices (1a and 1b) including the hollow cylindrical shaft part 10 has the size in the left-right direction as approximately 90%, and the size in the up-down direction each as approximately 82% and approximately 75%, in comparison with the optical devices (1c to 1e) including the shaft part (10c to 10e) with the u-shaped or plate shaped cross-section.

Other Embodiments

The optical devices (1a to 1e) in accordance with each of the above embodiments function as optical attenuators, but of course the function of the optical device may vary as long as a Faraday rotator is included. Thus, the shape of the birefringent elements is not limited to a wedge shape, and the side surface shape may be such as a parallelogram. Further, a wavelength-dependent optical device will not need a front birefringent element 32, and the rear birefringent element 33 may be changed to a polarizing plate such as polarcor.

Figure 10:
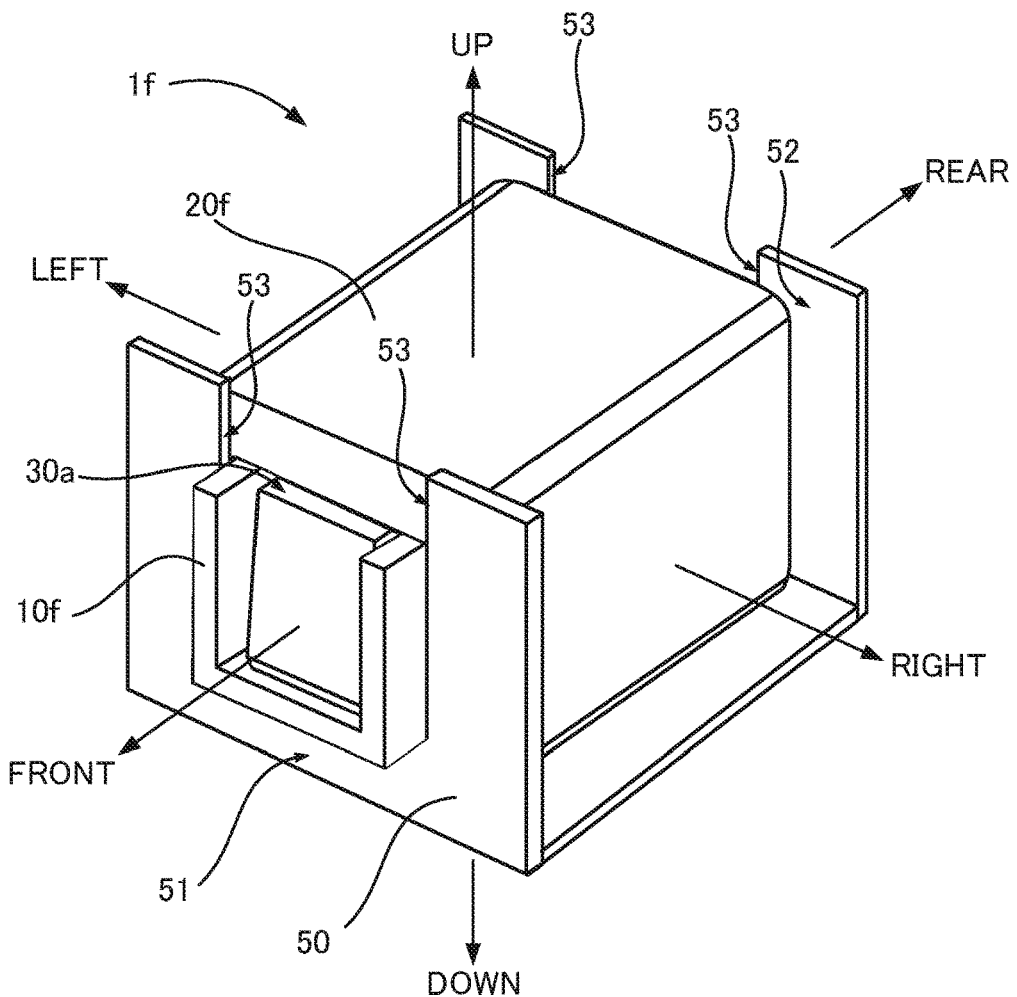
FIG. 10 is a diagram showing an optical device in accordance with another embodiment of this invention.

It is assumed that the optical devices (1a to 1e) of each of the embodiments are integrated in an optical communication device, and the device is set such that a beam that propagates within the optical communication device progresses along a central axis of the rectangular pillar Faraday element 31. When the up-down direction of the optical device (1a to 1e) is to be the height direction, however, since the optical devices (1a to 1e) in accordance with each embodiment is extremely small, the height from the lowest point of the optical device (1a to 1e) to the beam may be too high with respect to the optical device (1a to 1e). Then, as with an optical device if shown in FIG. 10, a shaft part 10f may be protruded to the front and the rear with respect to a coil part 20f, and a support base 50 may be provided to support the protruded section from below to adjust the height position of an optical device 30a. In the example shown in FIG. 10, the U shaped shaft part 10f is protruded to the front and the rear with respect to the coil part 20f corresponding to the optical device 1c in accordance with the second embodiment. The support base 50 is a U shape that is open upwards when seen along the left-right direction, and a front end face 51 and a rear end face 52 are each formed with a rectangular cutaway part 53 that comes in contact with the lower part and the sides of the shaft part 10f. Of course, with the hollow cylindrical shaft part 10 as similar to the optical device 1a in accordance with the first embodiment, the cylindrical shaft part 10 may be supported from below in the case where a semicircular cutaway part is provided to the front end face and the rear end face of the support base.

The optical device in accordance with each of the above embodiments are assumed to be set within various optical communication devices as a free space type, but the device may be stored within a case integrated with an optical fiber collimator to correspond to a pigtail type.

The above described embodiments are to facilitate understanding of this invention, and are not to limit understanding of the invention. The invention may be altered and modified without departing from the scope of the invention, and this invention includes its equivalents.

INDUSTRIAL APPLICABILITY

This invention can be used, for example, in optical communication technology.

REFERENCE SIGNS LIST 1a to 1f optical device,
10, 10c to 10f shaft part,
20, 20c to 20f coil part,
30a, 30b, 30d optical element,
31 Faraday element,
32, 33 birefringent element (polarizer or analyzer),
34 magnetooptical crystal film,
35 plate-like permanent magnet,
36 birefringent element (phaser),
37 compensation film,
38 spacer,
40 cylindrical permanent magnet,
50 support base.

The invention claimed is:

1. An optical device comprising:
a Faraday rotator; and
a shaft part,
wherein
the Faraday rotator includes
a Faraday element made of a magnetooptical material,
two plate-shaped permanent magnets, and
an electromagnet,
the Faraday element includes, with a direction of travel of light as a front-rear direction, light incident/emission surfaces in front and rear, and surfaces parallel to each other in left and right,
the two plate-shaped permanent magnets are attached to each of left and right side surfaces of the Faraday element such that different magnetic poles are opposed to each other, and the plate-shaped permanent magnets are configured to apply a permanent magnetic field to the Faraday element in one direction of a left direction and a right direction,
the shaft part holds the Faraday element, attached with the plate-shaped permanent magnets, over an entire length in the front-rear direction,
the electromagnet is configured including a coil made by winding a conductor around a periphery of the shaft part with the front-rear direction as an axis, and
the electromagnet is configured to apply to the Faraday element a variable magnetic field in the front-rear direction,
wherein the shaft part is a 5-sided box shape with a lower side as a bottom surface and an upper area that is open, and the shaft part is formed with an opening in a front face and a rear face to expose the light incident/emission surfaces of the Faraday element.

2. An optical device according to claim 1, wherein
the Faraday element is formed by laminating an even number of magnetooptical crystal films made of magnetooptical material in the front-rear direction, and
the magnetooptical crystal films that are adjacent to each other to front and rear have crystal faces forming 180 degrees with respect to each other.

3. An optical device according to claim 1, wherein
a cylindrical magnet made of a hollow cylindrical permanent magnet, and
a compensation film including light incident/emission surfaces to the front and the rear and being made of a magnetooptical material are included,
the cylindrical magnet is connected to the front face side of the box shaped shaft part to be coaxial,
the compensation film is arranged inside the cylindrical magnet,
a sum of a Faraday rotation angle of the compensation film that is obtained with the magnetic field in the front-rear direction that occurs within the hollow tube of the cylindrical magnet and a Faraday rotation angle of the Faraday element obtained with a leakage magnetic field to the rear side of the cylindrical magnet is 90 degrees, and
a direction of a variable magnetic field of the electromagnet is in a direction that cancels the leakage magnetic field.

4. An optical device according to claim 3, wherein
a frame shaped spacer that is open to the front and the rear is included, and the spacer is interposed between the compensation film and the front face side of the shaft part.

5. An optical device according to claim 1, wherein
a support base that supports the shaft part is included,
the shaft part is configured so that a front end of the shaft part protrudes further to the front than a front end of the coil, and a rear end of the shaft part protrudes further to the rear than a rear end of the coil, and
the support base supports the protruded sections of the shaft part from below so as to maintain an axis of the coil horizontally.

6. An optical device according to claim 1, wherein
the shaft part is flat shaped and opposes each other from the left and the right, and the shaft part sandwiches from the left and the right the Faraday element that has been attached with the permanent magnet.

7. The optical device according to claim 1, wherein the coil includes a hollow rectangular pillar coil part.

* * * * *